(12) United States Patent
Prahlad et al.

(10) Patent No.: US 7,802,067 B2
(45) Date of Patent: *Sep. 21, 2010

(54) INTERFACE SYSTEMS AND METHODS FOR ACCESSING STORED DATA

(75) Inventors: Anand Prahlad, East Brunswick, NJ (US); Randy De Meno, Staten Island, NY (US); Jeremy A. Schwartz, Red Bank, NJ (US); James J. McGuigan, Avon, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/777,823

(22) Filed: Jul. 13, 2007

(65) Prior Publication Data

US 2008/0016027 A1 Jan. 17, 2008

Related U.S. Application Data

(63) Continuation of application No. 11/302,528, filed on Dec. 12, 2005, now Pat. No. 7,315,924, which is a continuation of application No. 09/774,302, filed on Jan. 30, 2001, now Pat. No. 7,003,641.

(60) Provisional application No. 60/179,343, filed on Jan. 31, 2000.

(51) Int. Cl.
*G06F 12/00* (2006.01)

(52) U.S. Cl. ................ 711/162; 711/163; 707/999.203; 707/999.204

(58) Field of Classification Search ................ 711/161, 711/162, 163, 61; 707/203, 204, 999.203, 707/999.204
See application file for complete search history.

(56) References Cited

U.S. PATENT DOCUMENTS 4,686,620 A 8/1987 Ng
4,751,639 A 6/1988 Corcoran et al.

(Continued)

FOREIGN PATENT DOCUMENTS

EP 0259 912 A 3/1988

(Continued)

OTHER PUBLICATIONS

Microsoft, about using Microsoft Excel 2000 files with earlier version Excel, 1985-1999, Microsoft, p. 1.

(Continued)

*Primary Examiner*—Christian P Chace
*Assistant Examiner*—Mehdi Namazi
(74) *Attorney, Agent, or Firm*—Knobbe, Martens, Olson & Bear, LLP

(57) ABSTRACT

A modular data and storage management system. The system includes a time variance interface that provides for storage into a storage media of data that is received over time. The time variance interface of the modular data and storage management system provides for retrieval, from the storage media, of an indication of the data corresponding to a user specified date. The retrieved indication of the data provides a user with an option to access specific information relative to the data, such as content of files that are included in the data.

20 Claims, 8 Drawing Sheets

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,204,958 A | 4/1993 | Cheng et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,251 A | 7/1994 | Urabe et al. |
| 5,333,315 A | 7/1994 | Saether et al. |
| 5,347,653 A | 9/1994 | Flynn et al. |
| 5,410,700 A | 4/1995 | Fecteau et al. |
| 5,426,284 A | 6/1995 | Doyle |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,555,404 A | 9/1996 | Torbjornsen et al. |
| 5,559,957 A | 9/1996 | Balk |
| 5,574,898 A | 11/1996 | Leblang et al. |
| 5,613,134 A | 3/1997 | Lucus et al. |
| 5,619,644 A | 4/1997 | Crockett et al. |
| 5,638,509 A | 6/1997 | Dunphy et al. |
| 5,649,185 A | 7/1997 | Antognini et al. |
| 5,673,381 A | 9/1997 | Huai et al. |
| 5,699,361 A | 12/1997 | Ding et al. |
| 5,729,743 A | 3/1998 | Squibb |
| 5,734,817 A | 3/1998 | Roffe et al. |
| 5,737,747 A | 4/1998 | Vishlitsky et al. |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,395 A | 7/1998 | Whiting et al. |
| 5,806,058 A | 9/1998 | Mori et al. |
| 5,812,398 A | 9/1998 | Nielsen |
| 5,812,748 A | 9/1998 | Ohran et al. |
| 5,813,009 A | 9/1998 | Johnson et al. |
| 5,813,013 A | 9/1998 | Shakib et al. |
| 5,813,017 A | 9/1998 | Morris |
| 5,829,046 A | 10/1998 | Tzelnic et al. |
| 5,845,257 A | 12/1998 | Fu et al. |
| 5,860,073 A | 1/1999 | Ferrel et al. |
| 5,864,871 A | 1/1999 | Kitain et al. |
| 5,875,478 A | 2/1999 | Blumenau |
| 5,884,067 A | 3/1999 | Storm et al. |
| 5,887,134 A | 3/1999 | Ebrahim |
| 5,896,531 A | 4/1999 | Curtis et al. |
| 5,897,642 A | 4/1999 | Capossela et al. |
| 5,901,327 A | 5/1999 | Ofek |
| 5,924,102 A | 7/1999 | Perks |
| 5,926,836 A | 7/1999 | Blumenau |
| 5,950,205 A | 9/1999 | Aviani, Jr. |
| 5,956,733 A | 9/1999 | Nakano et al. |
| 5,974,563 A | 10/1999 | Beeler, Jr. |
| 6,018,744 A | 1/2000 | Mamiya et al. |
| 6,021,415 A | 2/2000 | Cannon et al. |
| 6,026,414 A | 2/2000 | Anglin |
| 6,026,437 A | 2/2000 | Muschett et al. |
| 6,052,735 A | 4/2000 | Ulrich et al. |
| 6,076,148 A | 6/2000 | Kedem |
| 6,078,934 A | 6/2000 | Lahey et al. |
| 6,088,694 A | 7/2000 | Burns et al. |
| 6,091,518 A | 7/2000 | Anabuki |
| 6,094,416 A | 7/2000 | Ying |
| 6,108,712 A | 8/2000 | Hayes, Jr. |
| 6,112,239 A | 8/2000 | Kenner et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,230,164 B1 | 5/2001 | Rikieta et al. |
| 6,249,795 B1 | 6/2001 | Douglis |
| 6,253,217 B1 | 6/2001 | Dourish et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler |
| 6,295,541 B1 | 9/2001 | Bodnar et al. |
| 6,301,592 B1 | 10/2001 | Aoyama et al. |
| 6,314,439 B1 | 11/2001 | Bates et al. |
| 6,314,460 B1 | 11/2001 | Knight et al. |
| 6,324,581 B1 | 11/2001 | Xu et al. |
| 6,328,766 B1 | 12/2001 | Long |
| 6,330,570 B1 | 12/2001 | Crighton |
| 6,330,572 B1 | 12/2001 | Sitka |
| 6,330,642 B1 | 12/2001 | Carteau |
| 6,343,287 B1 | 1/2002 | Kumar et al. |
| 6,343,324 B1 | 1/2002 | Hubis et al. |
| RE37,601 E | 3/2002 | Eastridge et al. |
| 6,356,801 B1 | 3/2002 | Goodman et al. |
| 6,360,306 B1 | 3/2002 | Bergsten |
| 6,367,029 B1 | 4/2002 | Mayhead et al. |
| 6,374,336 B1 | 4/2002 | Peters et al. |
| 6,389,432 B1 | 5/2002 | Pothapragada et al. |
| 6,421,711 B1 | 7/2002 | Blumenau et al. |
| 6,438,595 B1 | 8/2002 | Blumenau et al. |
| 6,453,325 B1 | 9/2002 | Cabrera et al. |
| 6,466,592 B1 | 10/2002 | Chapman |
| 6,470,332 B1 | 10/2002 | Weschler |
| 6,473,794 B1 | 10/2002 | Guheen et al. |
| 6,487,561 B1 | 11/2002 | Ofek et al. |
| 6,493,811 B1 | 12/2002 | Blades et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,546,545 B1 | 4/2003 | Honarvar et al. |
| 6,549,918 B1 | 4/2003 | Probert et al. |
| 6,553,410 B2 | 4/2003 | Kikinis |
| 6,557,039 B1 | 4/2003 | Leong et al. |
| 6,564,219 B1 | 5/2003 | Lee et al. |
| 6,564,228 B1 | 5/2003 | O'Connor |
| 6,593,656 B2 | 7/2003 | Ahn et al. |
| 6,647,409 B1 | 11/2003 | Sherman et al. |
| 6,658,436 B2 | 12/2003 | Oshinsky et al. |
| 6,704,933 B1 | 3/2004 | Tanaka et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,039,860 B1 | 5/2006 | Gautestad |
| 7,174,312 B2 | 2/2007 | Harper et al. |
| 7,447,692 B2 | 11/2008 | Oshinsky et al. |
| 2002/0004883 A1 | 1/2002 | Nguyen et al. |
| 2003/0163399 A1 | 8/2003 | Harper et al. |
| 2003/0172158 A1 | 9/2003 | Pillai et al. |
| 2005/0033800 A1 | 2/2005 | Kavuri et al. |

2005/0268068 A1    12/2005    Ignatius et al.

FOREIGN PATENT DOCUMENTS

| EP | 0 405 926 | | 1/1991 |
|---|---|---|---|
| EP | 0 467 546 | A | 1/1992 |
| EP | 0 599 466 | B1 | 6/1994 |
| EP | 0 774 715 | A | 5/1997 |
| EP | 0 809 184 | A | 11/1997 |
| EP | 0 899 662 | A | 3/1999 |
| EP | 0 981 090 | | 2/2000 |
| EP | 0 986 011 | A2 | 3/2000 |
| JP | H11-102314 | | 4/1999 |
| JP | H11-259459 | | 9/1999 |
| JP | 2001-60175 | | 3/2001 |
| WO | WO 94/17474 | | 8/1994 |
| WO | WO 95 13580 | A | 5/1995 |
| WO | WO 99/12098 | | 3/1999 |
| WO | WO 99/23585 | | 5/1999 |

OTHER PUBLICATIONS

Arneson, David A., Control Data Corporation, *Development of Omniserver*, Mass Storage Systems, 1990, pp. 88-93.

Luis-Felipe Cabrera et al.; *ADSM: A Multi-Platform, Scalable, Backup and Archive Mass Storage System*; Mar. 5, 1995; pp. 420-427, IBM Research Division.

Armstead et al.; "Implementation of a Campus-wide Distributed Mass Storage Service: The Dream vs. Reality," IEEE, 1995, pp. 190-199.

Arneson, "Mass Storage Archiving in Network Environments" IEEE, 1998, pp. 45-50.

Eitel, "Backup and Storage Management in Distributed Heterogeneous Environments," IEEE, 1994, pp. 124-126.

Rosenblum et al., "The Design and Implementation of a Log-Structure File System," Operating Systems Review SIGOPS, vol. 25, No. 5, New York, US, pp. 1-15 (May 1991).

Jason Gait, "The Optical File Cabinet: A Random-Access File system for Write-Once Optical Disks," IEEE Computer, vol. 21, No. 6, pp. 11-22 (1988) (see in particular figure 5 in p. 15 and the recitation in claim 5).

Jander, M.: "Launching Storage-Area Net", Data Communications, U.S, McGraw Hill, NY, vol. 27, No. 4 (Mar. 21, 1988), pp. 64-72.

International Search Report, PCT Application PCT/US02/17973, Aug. 22, 2002; 1 page.

Supplementary European Search Report, European Patent Application No. 02747883, Sep. 15, 2006; 2 pages.

Weatherspoon H. et al., "Silverback: A Global-Scale Archival System," Mar. 2001, pp. 1-15.

INTERFACE SYSTEMS AND METHODS FOR ACCESSING STORED DATA

RELATED APPLICATIONS

The present application is a continuation of U.S. patent application Ser. No. 11/302,528, filed Dec. 12, 2005, which is a continuation of U.S. patent application Ser. No. 09/774,302, filed on Jan. 30, 2001, titled "Logical View with Granular Access to Exchange Data Managed by a Modular Data and Storage Management System," now U.S. Pat. No. 7,003,641, issued Feb. 21, 2006, which is based on and claims the benefit of U.S. Provisional Patent Application No. 60/179,343, filed Jan. 31, 2000, each of which is hereby incorporated herein by reference in its entirety.

BACKGROUND OF THE INVENTION

1. Field of the Invention

The present invention generally relates to data storage in email systems and more particularly to the logical view with granular access to exchange data managed by a modular data and storage management system.

2. Description of the Related Art

Traditional methods have involved restoring the Microsoft Exchange Database in its entirety even if the goal of the operation was to restore just a single object (e-mail message). Such methods take much longer to accomplish operation (because of volume of data transferred during restores), require the Microsoft Exchange database to be taken offline, and may require extra disk storage to store a temporary copy of the restored data.

Many other problems and disadvantages of the prior art will become apparent to one skilled in the art after comparing such prior art with the present invention as described herein.

SUMMARY OF THE INVENTION

Various aspects of the present invention may be realized through a modular data and storage management system. The system includes a time variance interface that provides for storage into a storage media of data that is received over time. The time variance interface of the modular data and storage management system provides for retrieval, from the storage media, of an indication of the data corresponding to a user specified date. The retrieved indication of the data provides a user with an option to access specific information relative to the data, such as content of files that are included in the data.

In certain embodiments, the retrieved data of the modular data and storage management system is exchange data. A logical view of the retrieved data may be provided such that only a portion of the data is retrieved until specifically requested by a user. The logical view may create a state of the modular data and storage management system that corresponds to an earlier state of the system. The storage media is often divided into more than one subset of storage media to provide a separate location for the data during the time that it is stored. When the storage media is divided, the data may be migrated from one subset of storage media to another according to conditions such as length of time the data has been stored, type of data that has been stored, user that has stored the data, combinations of the specified conditions and similar conditions. The modular data and storage management system may also include a retrieval manager module having a master storage and backup map that is used to direct access to the data of the storage media such that data is retrieved only when specifically requested by the user.

Various aspects of the present invention may also be found in a method for a storage management system to display an index of stored data of a computer system. The method allows a user access to a state of the computer system on a user specified date, and involves, not necessarily in this order, the following: receiving data in the computer system; storing the data into a storage media via an organizational scheme that provides a separate storage location for various versions, if any, of the data; indexing the stored data according to the date that modifications were made to the data and according to the storage location of the data; specifying a date on which to view the state of the computer system; and retrieving the stored data that correspond to the state of the computer system on the specified date, the retrieved data including an option to retrieve additional data, if any, with respect to the retrieved data. The method could further include selecting the option to retrieve the additional data to thereby retrieve the additional data from the separate storage location of the storage media.

Still other aspects may be realized through a method for a computer system to display information regarding data storage in the computer system that corresponds to a state of the computer system on a user specified date. The method may include receiving data in the computer system; indexing the data according to the date the data was originally received; storing the data into a first storage media and a second storage media, the first storage media limited to indexing information of the data and the second storage media storing substantive data that corresponds to the indexing information; specifying a date on which to view the state of the computer system; and retrieving, from the first storage media, the stored data that correspond to the state of the computer system on the specified date, each of the retrieved data including display of an option to retrieve the substantive data, if any, from the second storage media. In this embodiment, the method may also include selecting the option to retrieve the substantive data to thereby transfer data associated with the indexing information from the second storage media to the computer system.

Other aspects of the present invention will become apparent with further reference to the drawings and specification which follow.

BRIEF DESCRIPTION OF THE DRAWINGS

In one embodiment of the present invention, certain aspects may be realized when data retrieval of an object or small collections of objects take only a small fraction of the time taken by traditional storage methods. Also, users may be allowed to view, in detail, exactly what objects are available for restore and their attributes at a given point-in-time. Users can also search for objects based on their attributes before choosing to retrieve them. All browsing and restoring of data is done without compromising availability of the Microsoft Exchange database.

Archival, retrieval, and indexing of Microsoft Exchange data as distinct end-user recognizable objects (such as an email message) with ability to browse these objects is enabled using certain aspects of the present invention. Also enabled is browsing of data at a user defined point-in-time, viewing different versions of the same object backed up at different points-in-time, and pattern searches in a logical view that the users are familiar with. Also enabled is the retrieval of objects backed up from one Microsoft Exchange database to a different target Microsoft Exchange target database.

DETAILED DESCRIPTION OF THE PREFERRED EMBODIMENTS

Figure 1:
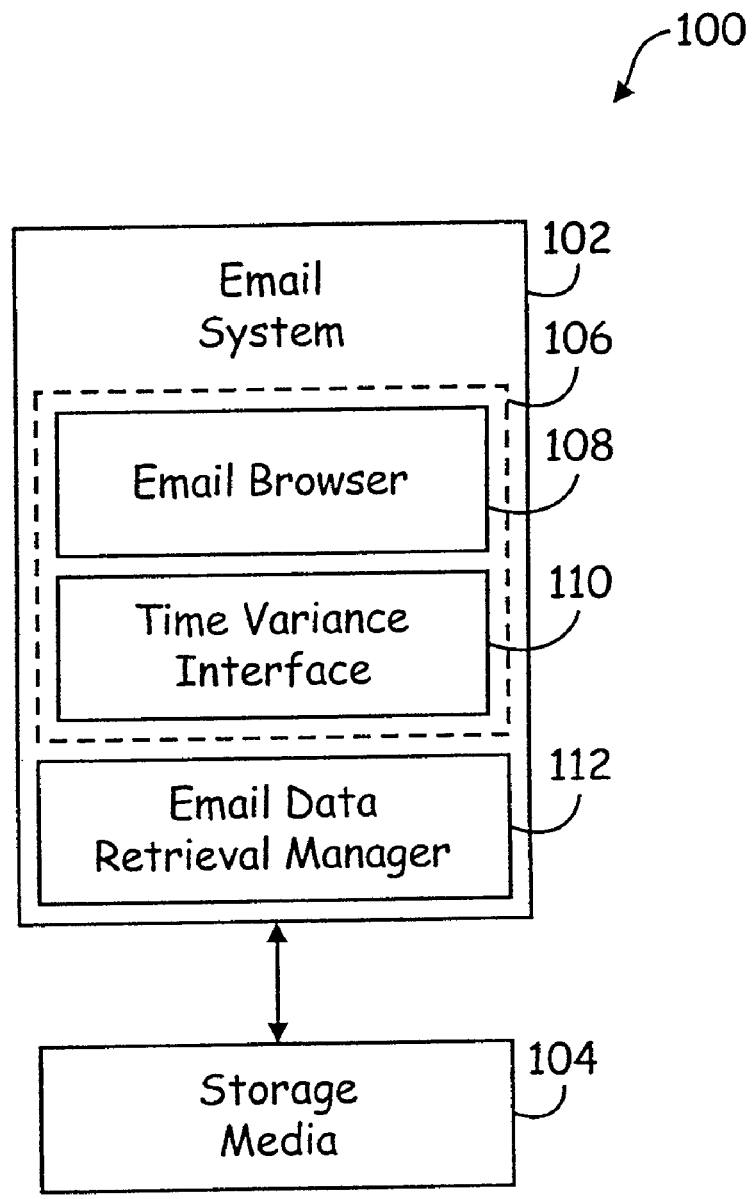
FIG. 1 is a block diagram of an exemplary embodiment of a data and storage management system built in accordance with principals of the present invention.

FIG. 1 is a block diagram of an exemplary embodiment of a data and storage management system 100 built in accordance with principals of the present invention. The data and storage management system 100 includes an e-mail system 102 that communicates with storage media 104 to access and store e-mail that is received in or sent from the e-mail system 102. The e-mail system 102 includes a retrieval application 106 that has an e-mail browser 108 and a time variance interface 110 for interfacing with an e-mail data retrieval manager 112. The e-mail data retrieval manager 112 interfaces with the storage media 104 to access e-mail that has been received in the e-mail system 102.

The data and storage management system 100 allows a user to access e-mail from the storage media 104 in numerous manners including accessing e-mail from a particular date such that the e-mail browser 108 appears as though it is operating on a given date and time other than the current date and time. Thus, if the user desires to view the system in the past, the user may see the e-mail system 102 as it existed at any time.

Figure 2:
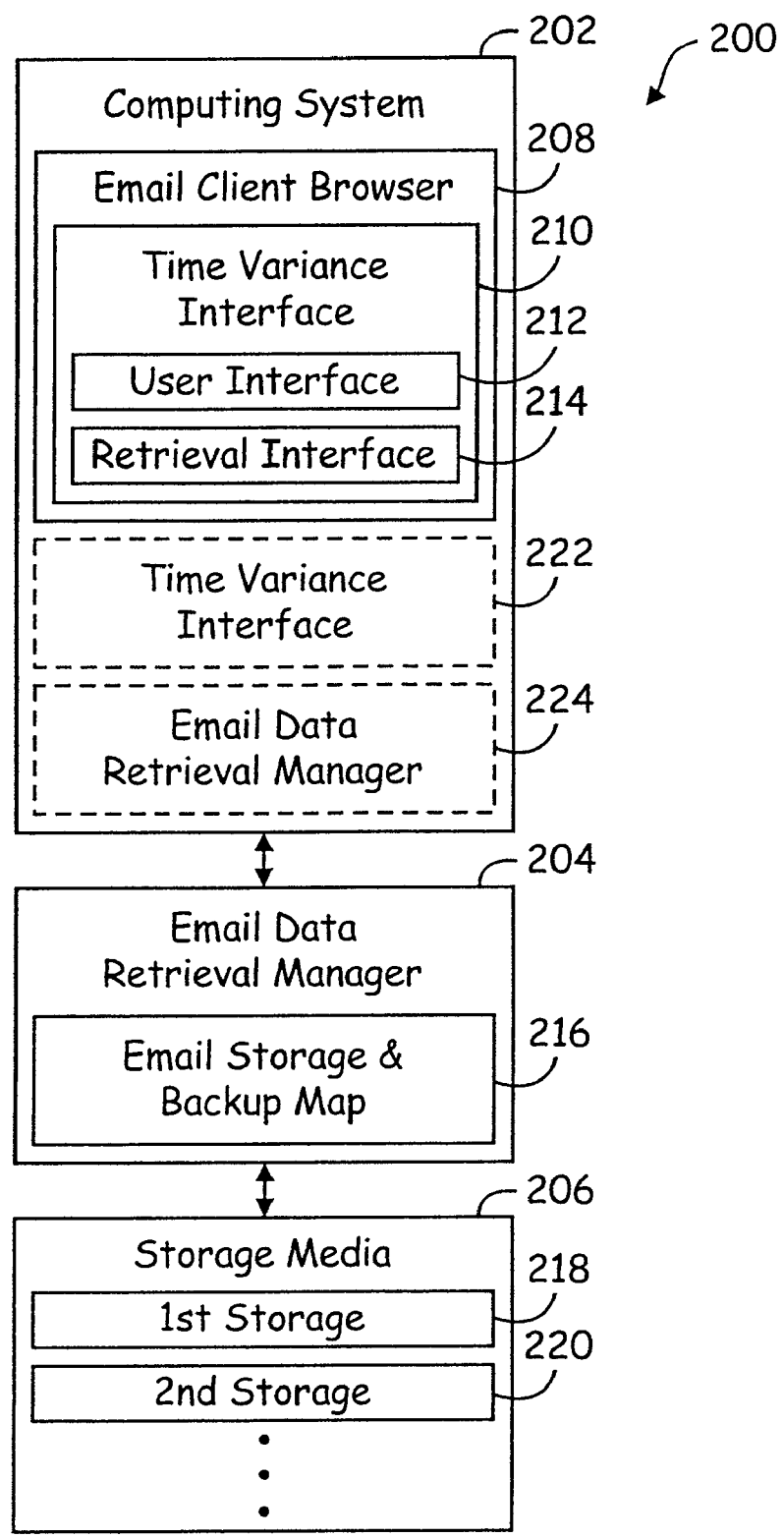
FIG. 2 is a block diagram of an exemplary data and storage management system.

FIG. 2 is a block diagram of an exemplary data and storage management system 200. The data and storage management system 200 includes a computing system 202 that interacts with an e-mail data retrieval manager 204 to retrieve and store messages from storage media 206.

The computing system 202 includes an e-mail client browser 208 that includes a time variance interface 210. The time variance interface 210 includes a user interface 212 and a retrieval interface 214. The retrieval interface 214 interacts with the e-mail data retrieval manager 204 and accesses information according to directions found in an e-mail storage and backup map 216. The e-mail storage and backup map 216 includes information that allows the retrieval interface 214 to assist the e-mail client browser 208 in retrieving data from the storage media 206. The storage media 206 includes numerous types of storage media which are labeled as a first storage media 218 and a second storage media 220. Of course, many more instances of storage media could exist on the storage media 206 as indicates by the dots representing continued storage media.

The dashed lines in FIG. 2 indicate optional variations and additions to the data and storage management system 200. For example, a time variance interface 222 may be included in the computing system 202 to assist in retrieval of e-mail messages. Also, an e-mail data retrieval manager 224 may be included to alleviate some of the processing that would otherwise take place at the e-mail data retrieval manager 204.

Figure 3:
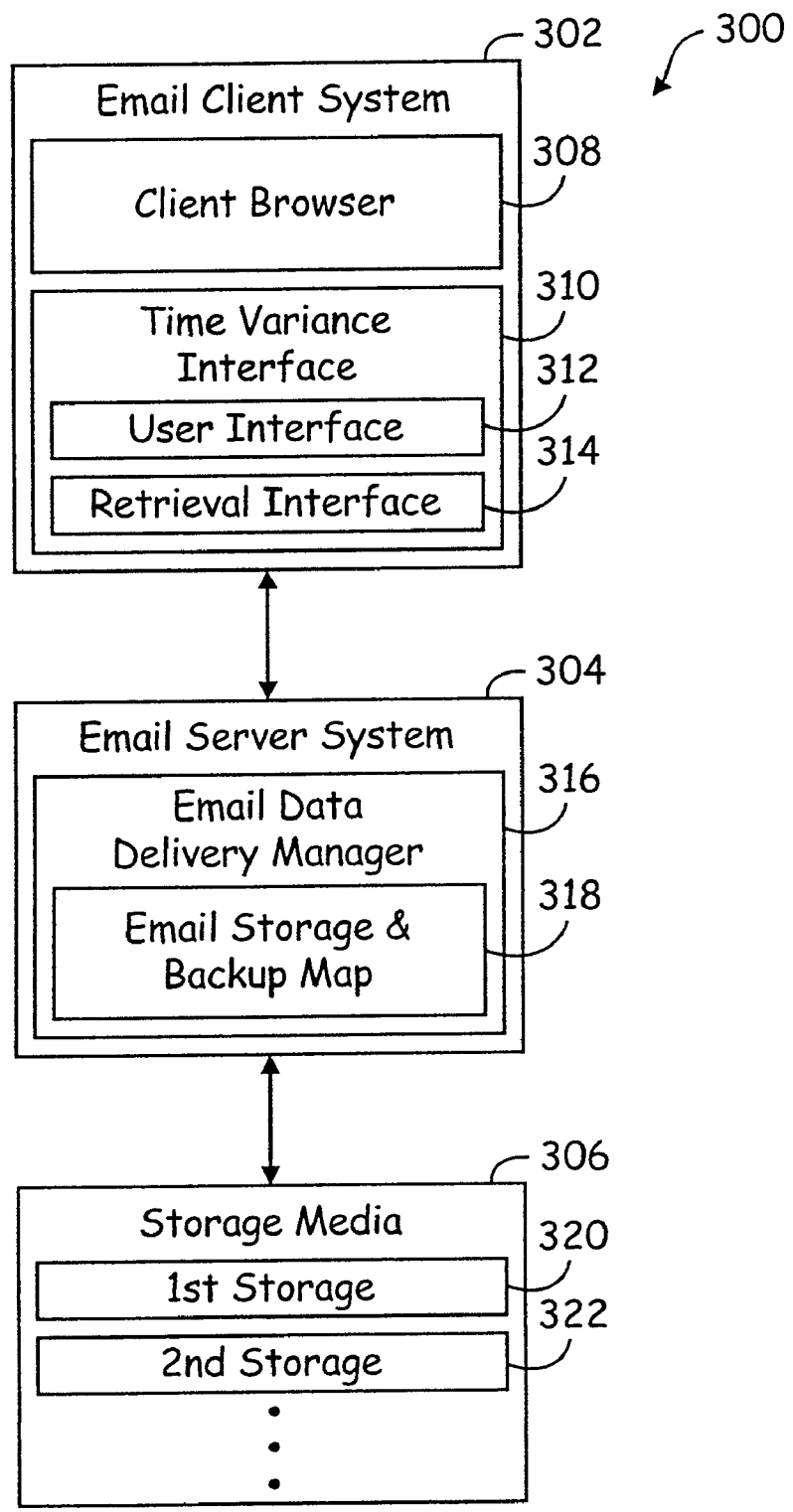
FIG. 3 is a block diagram of an exemplary embodiment of another data and storage management system.

FIG. 3 is a block diagram of an exemplary embodiment of another data and storage management system 300. The data and storage management system 300 includes an e-mail client system 302, an e-mail server system 304, and storage media 306. The e-mail client system 302 includes a client browser 308 and a time variance interface 310. The time variance interface 310 includes a user interface 312 and a retrieval interface 314.

The e-mail server system 304 includes an e-mail data delivery manager 316 which operates using an e-mail storage and backup map 318. The e-mail storage and backup map 318 directs the client browser 308 where to go in the storage media 306 to access an e-mail message. The storage media 306 includes numerous storage media, such as, a first storage media 320 and a second storage media 322. As indicated by the ". . ." more storage media may be added, as necessary, in the storage media 306 of the storage and management system 300.

Figure 4:
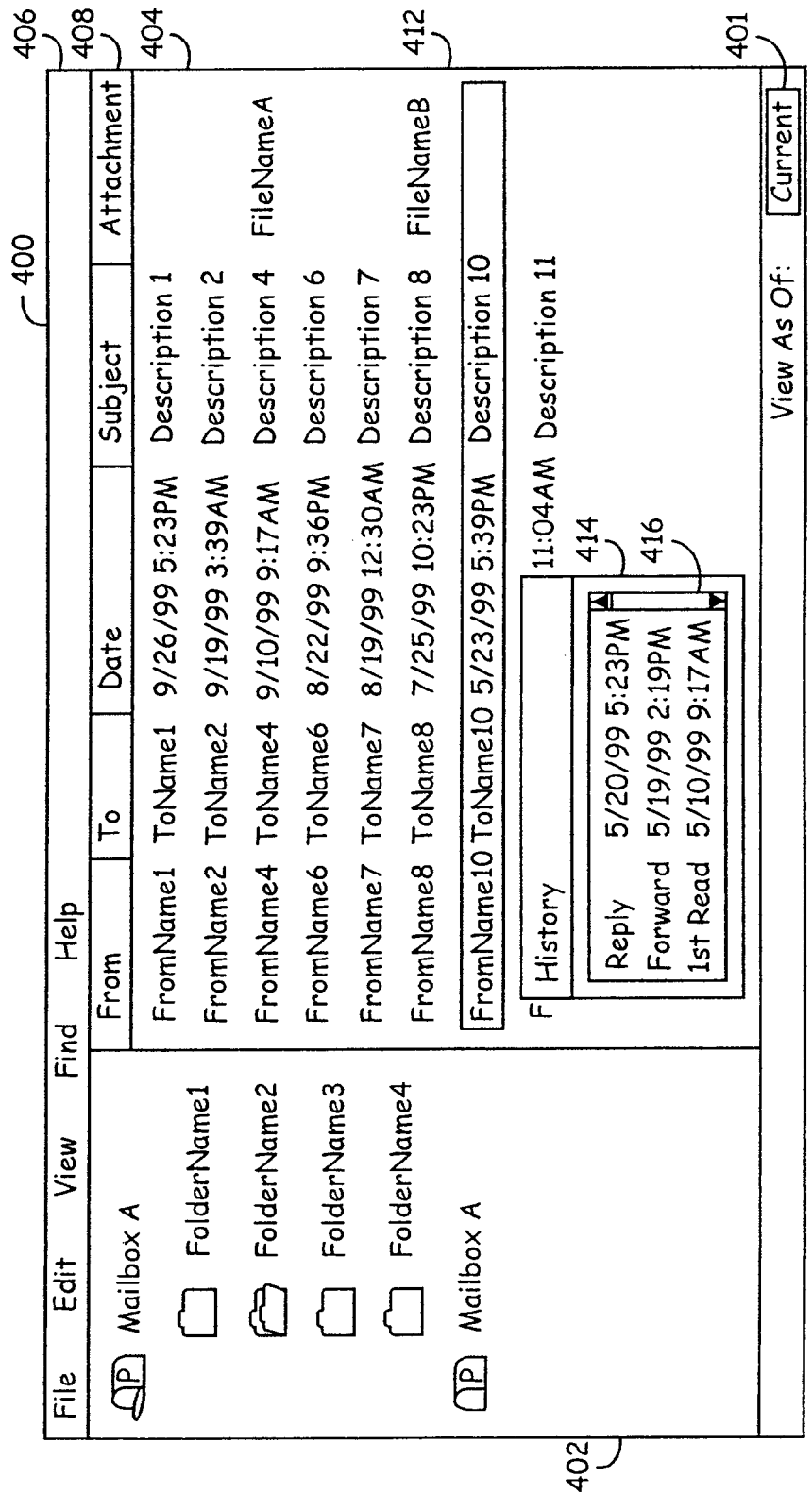
FIG. 4 is an exemplary e-mail browser that may operate in the data and storage management systems of FIGS. 1, 2, and 3.

FIG. 4 is an exemplary e-mail browser 400 that may operate in the data and storage management systems 100, 200, and 300. The e-mail browser 400 includes a "view as of" box 401 where a user may indicate the date of interest for viewing e-mail. As illustrated, the "view as of" box 401 is labeled current to represent the current date of the storage and retrieval system.

The e-mail browser 400 includes a mailbox/folder hierarchy 402 where mailboxes are shown as well as folders that may be accessed. The e-mail browser 400 also includes a message list 404 where each of the messages received in the system are listed. A toolbar 406 is illustrated across the top of the e-mail browser 400. The toolbar 406 includes standard Windows functions such as file, edit, view, find, and help.

The message list 404 includes a message list display selector 408 that allows a user to select which portions of a message to view in the e-mail browser 400. In the e-mail browser 400, the selections shown in the message list display selector 408 are the following: from, to, date, subject, and attachment.

A user may select a message to view as indicated by a selected message 412. When the user selects the message, the user may choose to view the history of the message and activate a history dialog box 414. The history dialog box 414 shows the different stages of the message such as the date the message was first read, forwarded, or replied to. If a user desires to view further states of the messages, the user may activate a scroll bar 416 to view more options for the e-mail message.

Figure 5:
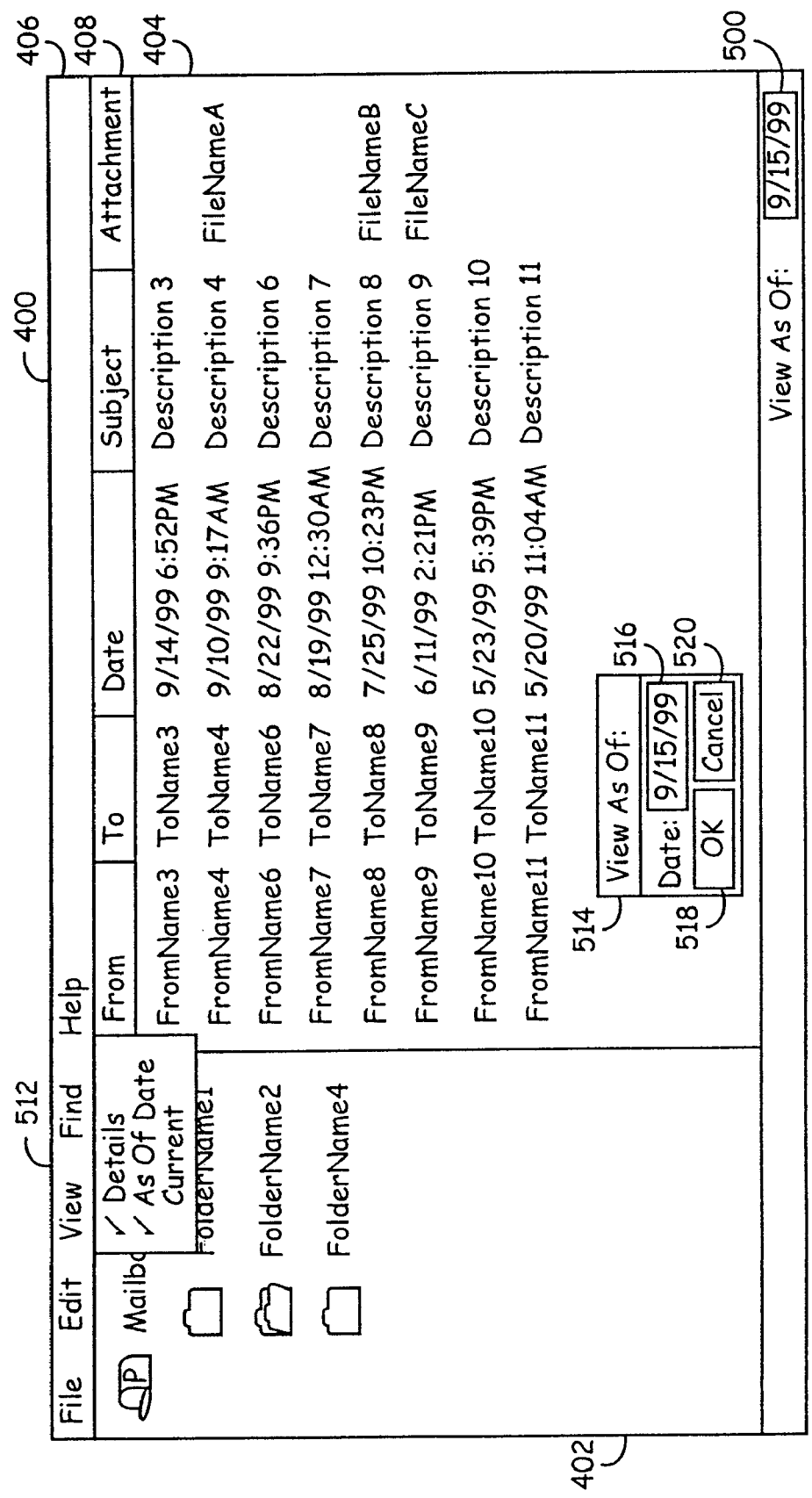
FIG. 5 is an exemplary diagram of the e-mail browser of FIG. 4 as it would appear when other options are selected by a user.

FIG. 5 is an exemplary diagram of the e-mail browser 400 as it would appear when other options are selected by a user. Specifically, a user may choose a different date to view the e-mails as illustrated in a "view as of" box 500 where the date "Sep. 15, 1999" has been selected by the user.

Selection of the "Sep. 15, 1999" date alters the mailboxes and folders that appear in the mailbox/folder hierarchy 402. As illustrated, only one mailbox appears and not all folder names appear that appeared when the "view as of" date was selected to be "current". Also different in FIG. 5, are the messages that appear in the message list 404. Only messages that were received prior to Sep. 15, 1999, are illustrated in the message list 404. The toolbar 406 and the message list display selector 408 are both identical to the e-mail browser 400 as previously illustrated.

When a view menu 512 is selected, a user may choose which options they desire for their particular needs of the e-mail browser 400. A "view as of" box 514 may be activated by the user and a date box 516 appears which the user can use to enter the date of interest in the e-mail browser 400. After the date has been selected, the user may enter the date into the system by pressing an okay button 518. If the user decides to exit the "view as of" box 514 without making changes, the user can press a cancel button 520.

Figure 6:
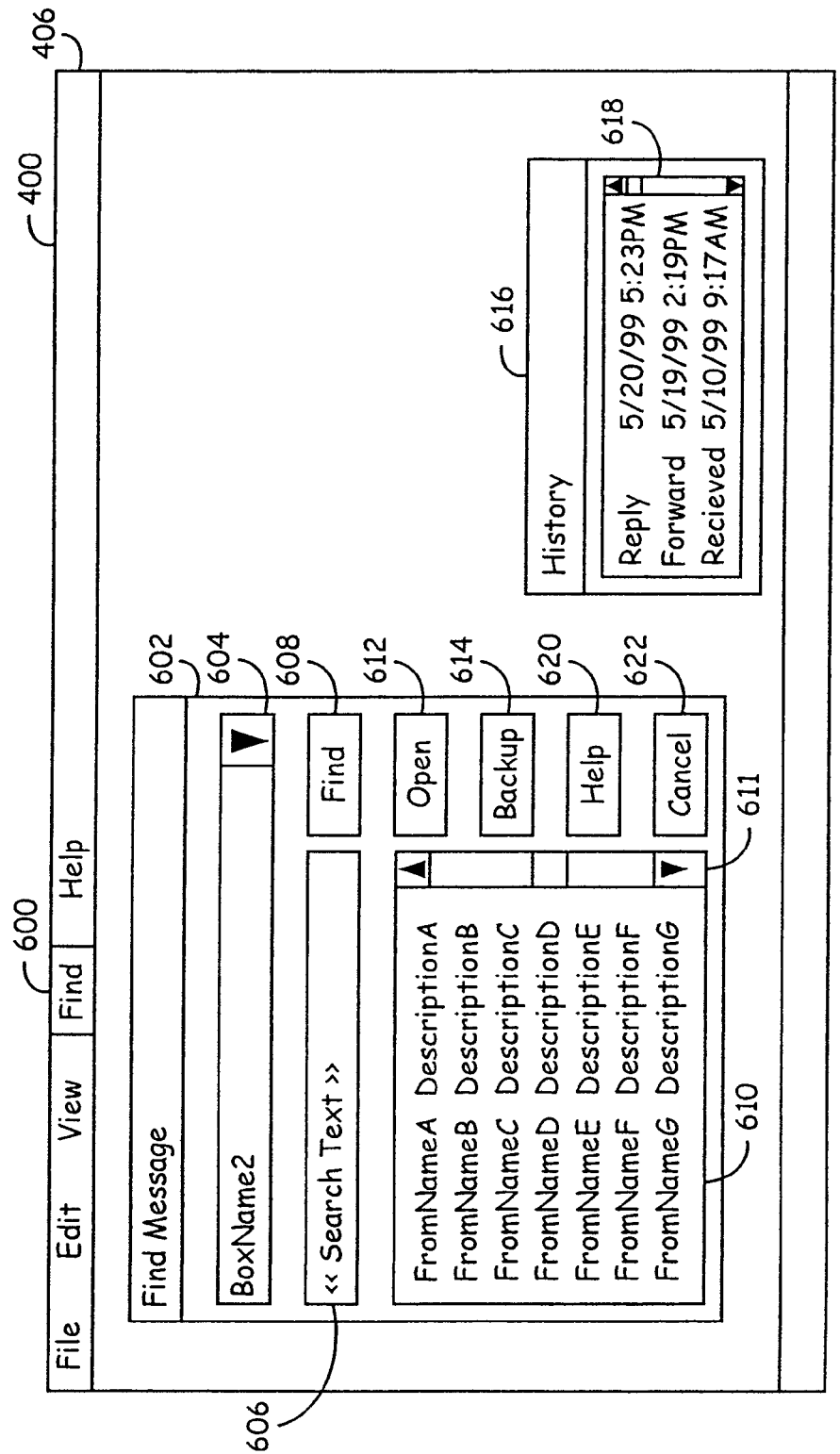
FIG. 6 is an exemplary illustration of the e-mail browser of FIG. 4 as it may be used to find particular messages in the data and storage management systems of FIGS. 1, 2, and 3.

FIG. 6 is an exemplary illustration of the e-mail browser 400 as it may be used to find particular messages in the data and storage management systems 100, 200 and 300. A find menu 600 may be selected by the user from the toolbar 406 and a find message dialog box 602 may be selected to appear on the e-mail browser 400. The find message dialog box 602 includes a boxname selector box 604 where the user can select which mailbox they would like to perform the search in. A search text box 606 is available for the user to enter particular terms of the message for which they would like to search. Of course, the search terms can include wild cards or other custom text for which to find. Upon entry of the search text in the search text box 606, the user presses a find button 608 which causes a search to be performed and all messages which are found appear in a message list 610. The user may use a scroll bar 611 to find the particular message of interest. Upon finding the particular message of interest, the user may press an open button 612 to view the message. The user may also press a backup button 614 to view the usage history of the particular message of interest. When the backup button 614 is pressed, a history box 616 appears and the history of the selected message appears. A scroll bar 618 is available for the user to scroll through the messages if the list goes beyond the bounds of the history box 616. As with typical Windows applications, a help button 620 is available for the user to press when in need of help using the find message dialog box 602. The user may also press a cancel button 622 to exit the find message dialog box 602.

Figure 7:
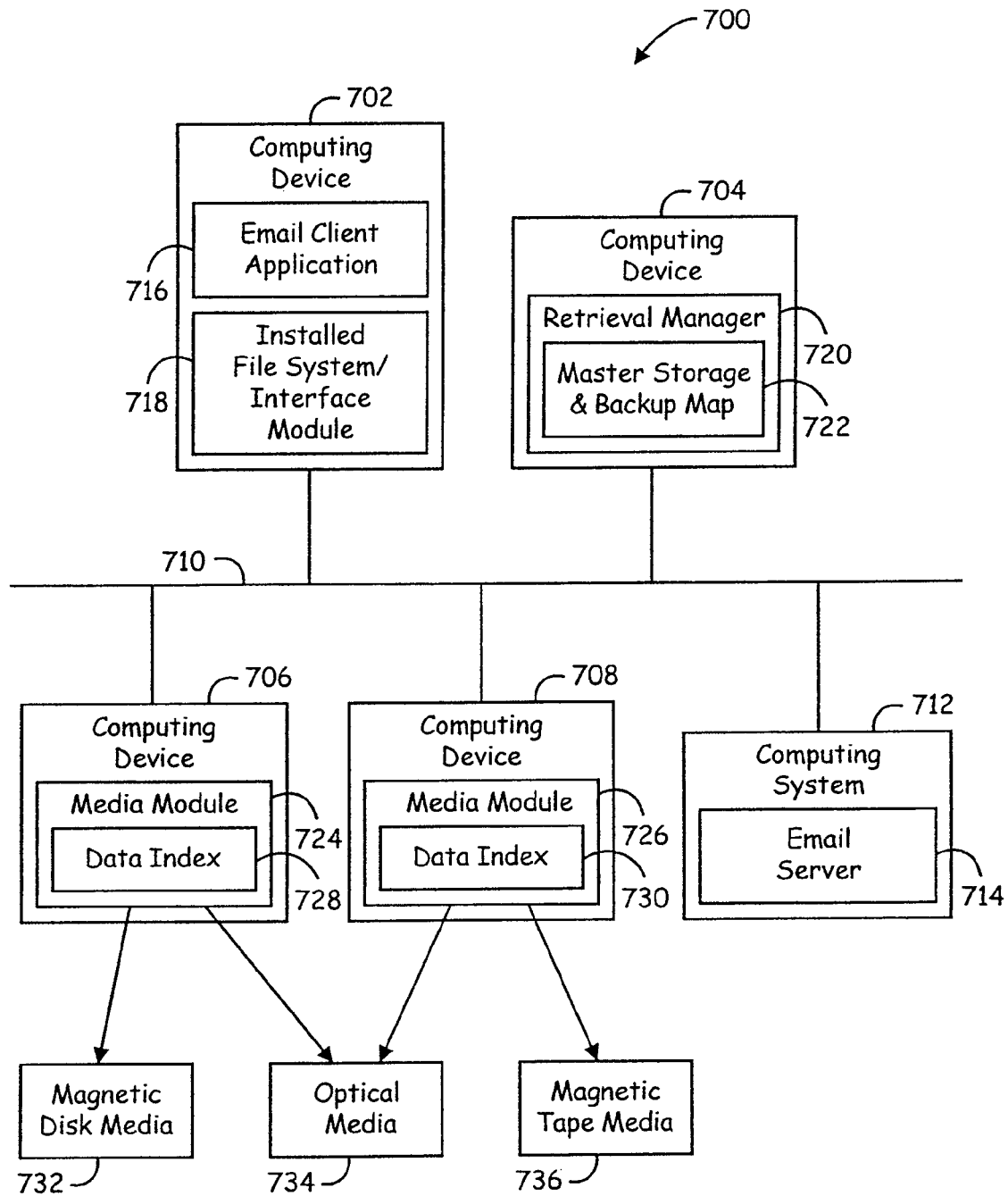
FIG. 7 illustrates an exemplary embodiment of a data and storage management system.

FIG. 7 illustrates an exemplary embodiment of a data and storage management system 700. The data and storage management system 700 includes computing devices 702, 704, 706, and 708 which interact across a network 710, such as an Ethernet network. A computing system 712 is also available to interact with the computing devices 702-708. The computing system 712 includes an e-mail server 714 for receiving and sending e-mails to and from the data and storage management system 700.

When the data and storage management system 700 is in operation, an e-mail client application 716 on the computing device 702 may request to view an e-mail message. Installed file system/interface module 718 interacts with a retrieval manager 720 of the computing device 704. The retrieval manager 720 includes a master storage and backup map 722 that directs the request to one of the computing devices 706 and 708. At the computing devices 706 and 708, respective media modules 724 and 726 exist to help the retrieval request know where the desired message is located. For further assistance in locating the desired message, the media module 724 and 726 include respective data indexes 728 and 730. In this manner, the e-mail client application 716 is able to request a message and the message is retrieved from one of the storage media, i.e., magnetic disk media 732, optical media 734, or magnetic tape media 636.

Of course, the storage media illustrated in FIG. 7 is exemplary storage media and additional storage media could be used while the data management scheme is continually tracked by the media modules 724 and 726 of the data and storage management system 700.

Figure 8:
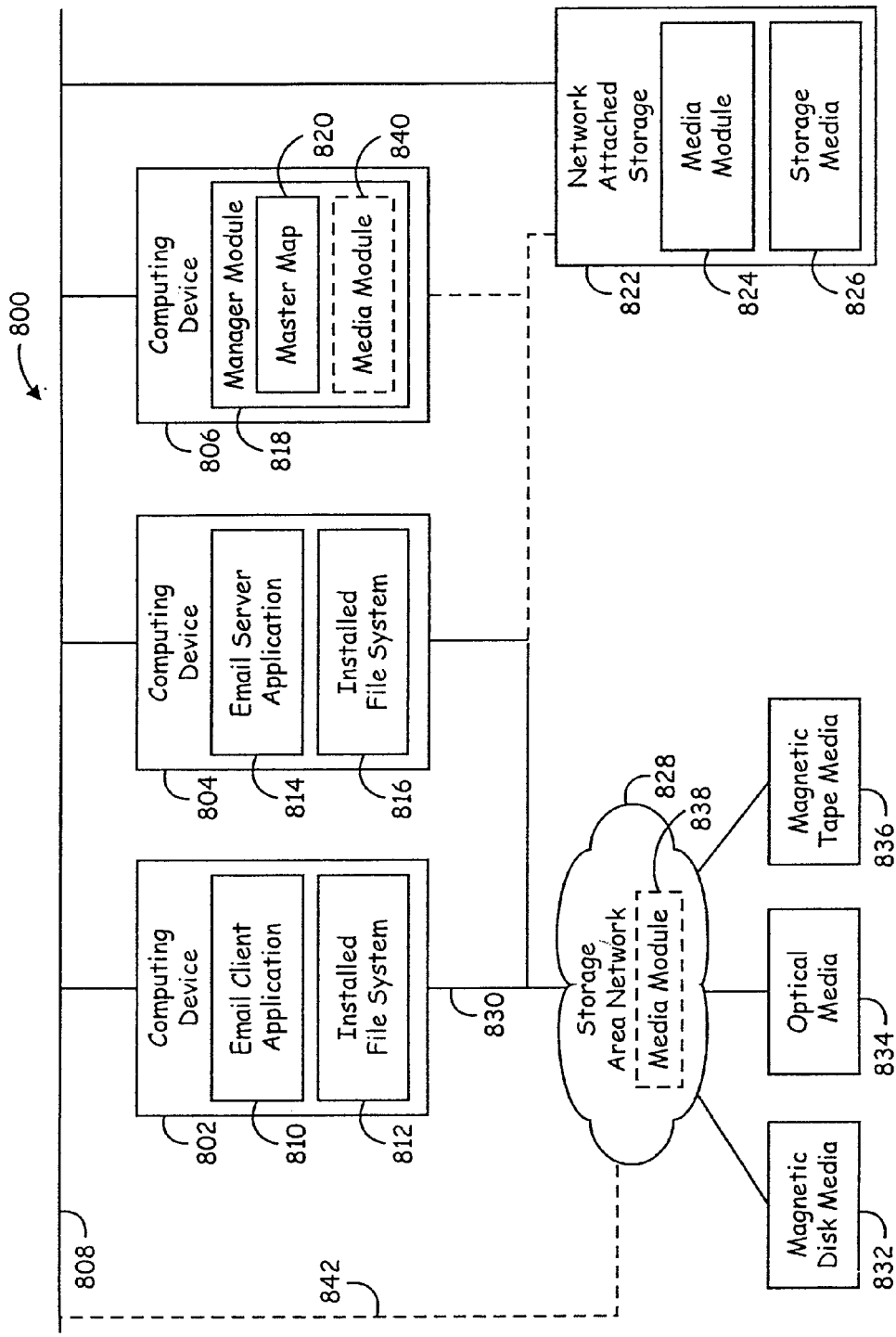
FIG. 8 illustrates an exemplary embodiment of another data and storage management system.

FIG. 8 illustrates an exemplary embodiment of a data and storage management system 800. The data and storage management system 800 includes computing devices 802, 804, and 806 which communicate across a network 808, such as an Ethernet network. An e-mail client application 810 is illustrated in the computing device 802 and may request to view an e-mail message through an installed file system 812. Similarly, an e-mail server application 814 operates on the computing device 804 and interacts with an installed file system 816. The computing devices 802 and 804 commonly interact with the computing device 806 across the network 808 where a manager module 818 is accessed and a master map 820 is available to retrieve more detailed information on the location of messages in the data and storage management system 800. If the e-mail client application 810 has requested an e-mail, the installed file system 812 may interact with a network attached storage 822 where a media module 824 interacts with storage media 826 to retrieve the desired e-mail message requested by the e-mail client application 810.

Alternatively, the installed file system 812 may interact with a storage area network 828 across a network 830, the network 830 commonly being a high speed fibre network. The storage area network 828 makes accessing storage media such as magnetic disk media 832, optical media 834, and magnetic tape media 836 available without significant processing in the computing device 802. To find the exact location or the message, a media module 838 (shown in dashed lines to represent the optional nature of it's location within the storage area network 828) may be used to locate the message. In addition, a media module 840 shown in dashed lines may be available to find the exact location of the message. Also shown in dashed lines is an extension of the network 830 where the network attached storage 822 may include a high speed connection with the computing devices 802, 804, and 806. Finally, the storage area network 828 may communicate directly with the network 808 as indicated by dashed lines 842.

As those skilled in the art will understand upon viewing the present disclosure, certain aspects of the invention may be integrated with other applications (such as document management systems, workflow management systems, etc.) that have been built atop of Microsoft Exchange which allows end users of such systems to access their data transparently across time and versions.

What is claimed is:

1. A method for accessing data corresponding to a state of a computer system on a user specified date, the method comprising:

storing, in storage media, data from an application program on a computer system via a scheme that provides a separate storage location for various versions of the data;

receiving a date on which to view a state of the computer system that existed after a first version of the data and prior to a second version of the data; and retrieving, based on the date, the stored first version of the data that corresponds to the state of the computer system on the specified date, the retrieved data being displayed in a current version of the application program in a manner that is similar to a view of the state of the computer system at the specified date.

2. The method of claim 1, additionally comprising indexing the stored data according to the date the data was originally received.

3. The method of claim 1, wherein said storing comprises:

storing in first storage media index information of the data; and storing in second storage media substantive data that corresponds to the index information.

4. The method of claim 3, wherein the retrieved data includes an option to retrieve the substantive data, if any, with respect to the retrieved data.

5. The method of claim 1, wherein said receiving comprises receiving the selection of the date from a user through a graphical user interface.

6. The method of claim 5, wherein said stored data corresponds to a plurality of e-mail messages.

7. The method of claim 6, additionally comprising providing through the graphical user interface a history of a selected one of said plurality of e-mail messages.

8. The method of claim 1, additionally comprising migrating the stored data from one subset of the storage media to another subset of the storage media according to at least one of: a length of time the data has been stored, a type of data that has been stored, a user that has stored the data.

9. A system for managing the retrieval of stored data, the system comprising:
    an interface that provides for retrieval, from storage media, different versions of data, wherein the interface receives a user-specified date that corresponds to a state of an application program existing after a first version of the data and prior to a second version of the data, and wherein the interface, based on the user-specified data, displays an indication of the first version of the data existing at the user-specified date in a current version of the application program,
    wherein the retrieved indication of the first version of the data provides a user with an option to access specific information relative to the first version of the data, and wherein the retrieved indication of the first version of the data is similar to a view of an indication of the first version of the data in the application program at the user-specified date.

10. The system of claim 9, wherein a logical view of the retrieved first version of the data is provided such that only a portion of the first version of the data is retrieved until specifically requested by a user.

11. The system of claim 9, wherein the storage media comprises a plurality of subsets of storage media to provide a separate location for the data during the time that it is stored.

12. The system of claim 11, further comprising a manager module configured to migrate data from one subset to another subset according to at least one of: a length of time the data has been stored, a type of data that has been stored, and a user that has stored the data.

13. The system of claim 11, wherein a first subset of the storage media is configured to store indexing information of the data, and wherein a second subset of the storage media is configured to store substantive data that corresponds to the indexing information.

14. The system of claim 9, further comprising a retrieval module in communication with the interface, the retrieval module being configured to access the stored data in the storage media.

15. The system of claim 14, wherein the retrieval module includes a map that indicates a location of stored data on the storage media.

16. The system of claim 14, wherein the interface further comprises:
    a graphical user interface configured to receive the user-specified date;
    and a retrieval interface configured to instruct the retrieval module to retrieve the indication of the data from the storage media.

17. The system of claim 9, wherein the interface comprises an e-mail browser.

18. A data retrieval system for accessing data corresponding to a state of a computer system on a user-specified date, the data retrieval system comprising:
    means for storing, in storage media, data from an application program on a computer system via an organizational scheme that provides a separate storage location for different versions of the data;
    means for receiving a date on which to view a state of the computer system that existed after a first version of the data and prior to a second version of the data; and
    means for retrieving, based on the date, the first version of the data that corresponds to the state of the computer system on the selected date, the retrieved data being displayed in a current version of the application program in a manner that is similar to a view of the state of the computer system at the selected date.

19. The data retrieval system of claim 18, further comprising means for indexing the different versions of the stored data.

20. The data retrieval system of claim 18, further comprising means for displaying options to a user for selecting the date.

* * * * *